(12) United States Patent
Van Donk et al.

(10) Patent No.: US 9,242,234 B2
(45) Date of Patent: Jan. 26, 2016

(54) MODIFIED Y-TYPE ZEOLITES HAVING A TRIMODAL INTRACRYSTALLINE STRUCTURE, METHOD FOR MAKING SAME, AND USE THEREOF

(71) Applicants: CENTRE NATIONAL DE LA RECHERCHE SCIENTIFIQUE, Paris (FR); TOTAL MARKETING SERVICES, Puteaux (FR)

(72) Inventors: Sander Van Donk, Sainte-Adresse (FR); Maxime Lacroix, Uccle (BE); Régine Kenmogne-Gatchuissi, Calgary (CA); François Fajula, Teyran (FR); Métin Bulut, Heusden-Zolder (BE); Jean-Pierre Dath, Beloeil Hainault (BE); Krijn Pieter De Jong, Houten (NL); Petra Elisabeth De Jongh, Utrecht (NL); Jovana Zecevic, Utrecht (NL); Adrianus Nicolaas Cornelis Van Laak, Houten (NL)

(73) Assignees: CENTRE NATIONAL DE LA RECHERCHE SCIENTIFIQUE, Paris (FR); TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 14/808,519

(22) Filed: Jul. 24, 2015

(65) Prior Publication Data
US 2015/0328625 A1 Nov. 19, 2015

Related U.S. Application Data

(63) Continuation-in-part of application No. 13/141,281, filed as application No. PCT/FR2009/052668 on Dec. 22, 2009, now Pat. No. 9,126,183.

(30) Foreign Application Priority Data

Dec. 22, 2008 (FR) ..................... 08 58952

(51) Int. Cl.
*B01J 29/08* (2006.01)
*C01B 39/24* (2006.01)
(Continued)

(52) U.S. Cl.
CPC .............. *B01J 29/084* (2013.01); *B01J 37/009* (2013.01); *B01J 37/0201* (2013.01); *B01J 37/04* (2013.01);
(Continued)

(58) Field of Classification Search
CPC .................................. B01J 29/04; B01J 29/08
See application file for complete search history.

(56) References Cited

U.S. PATENT DOCUMENTS

| 4,663,025 A | 5/1987 | Fu |
| 5,227,352 A | 7/1993 | Tsujii et al. |

(Continued)

FOREIGN PATENT DOCUMENTS

| AU | 717421 B2 | 4/1998 |
| EP | 1 938 898 A1 | 7/2008 |

(Continued)

OTHER PUBLICATIONS

Groen, et al., "Optimal Aluminum-Assisted Mesoporosity Development in MFI Zeolites by Desilication," Journal of Physical Chemistry B, Aug. 7, 2004, pp. 13062-13065, vol. 108, No. 35.

(Continued)

*Primary Examiner* — Brian McCaig
(74) *Attorney, Agent, or Firm* — Sughrue Mion, PLLC

(57) ABSTRACT

The invention relates to a Y-type zeolite having a modified faujasite structure, the intracrystalline structure of which includes at least one network of micropores, at least one network of small mesopores having an average diameter ranging from 2 to 5 nm, and at least one network of large mesopores having an average diameter range from 10 to 50 nm. The invention also relates to particles including such zeolites and to the use thereof in a method for processing crude oil, particularly as a hydrocracking catalyst.

45 Claims, 6 Drawing Sheets

(51) Int. Cl.
  *B01J 37/04* (2006.01)
  *B01J 37/00* (2006.01)
  *B01J 37/06* (2006.01)
  *B01J 37/08* (2006.01)
  *B01J 37/02* (2006.01)
  *C10G 47/18* (2006.01)
  *B01J 29/04* (2006.01)

(52) U.S. Cl.
  CPC *B01J 37/06* (2013.01); *B01J 37/08* (2013.01); *C01B 39/24* (2013.01); *C10G 47/18* (2013.01); *B01J 2229/16* (2013.01); *B01J 2229/42* (2013.01); *C01P 2006/12* (2013.01); *C01P 2006/14* (2013.01); *C01P 2006/16* (2013.01)

(56) References Cited

U.S. PATENT DOCUMENTS

| | | | | |
|---|---|---|---|---|
| 5,342,507 | A | * | 8/1994 | Dai ........................ C10G 47/20 208/111.15 |
| 5,601,798 | A | | 2/1997 | Cooper et al. |
| 2002/0179492 | A1 | | 12/2002 | Zhao et al. |

FOREIGN PATENT DOCUMENTS

| | | |
|---|---|---|
| JP | 4-59616 A | 2/1992 |
| JP | 2012-502876 A | 2/2012 |
| WO | 2009/062742 A2 | 5/2009 |
| WO | 2010/033202 A1 | 3/2010 |

OTHER PUBLICATIONS

Le Van Mao, et al., "pH of the Sodium Carbonate Solution used for the Desilication of Zeolite Materials," Journal of Materials Chemistry, The Royal Society of Chemistry, Jan. 1. 1995, pp. 533-535, vol. 5, No. 1.

Le Van Mao, et al., "Selective Removal of Silicon from Zeolite Frameworks using Sodium Carbonate," Journal Materials Chemistry, The Royal Society of Chemistry, Jan. 1, 1994, pp. 605-610, vol. 4, No. 4.

Tao, et al., "Mesopore-Modified Zeolites: Preparation, Characterization, and Applications," Chemical Reviews, Jan. 31, 2006, pp. 896-910, vol. 106, No. 3.

Van Donk, et al., "Generation, Characterizaion, and Impact of Mesopores in Zeolite Catalysts," Catalysis Reviews, Science and Engineering, Jan. 1, 2003, pp. 297-319, vol. 45, No. 2.

Sekine, et al, "Change by alkaline treatment in pore structure and acidic quality of USY zeolite," The $31^{st}$ Petro/Petrochemistry Debates Abstract, The Japan Petroleum Institute, pp. 259-260 (E25) (Nov. 1, 2001).

Japanese Office Action dated Dec. 10, 2013, and issued by the Japanese Patent Office in corresponding patent application No. 2011-541577.

International Search Report dated Jun. 26, 2010, issued in corresponding PCT/FR2009/052668.

* cited by examiner

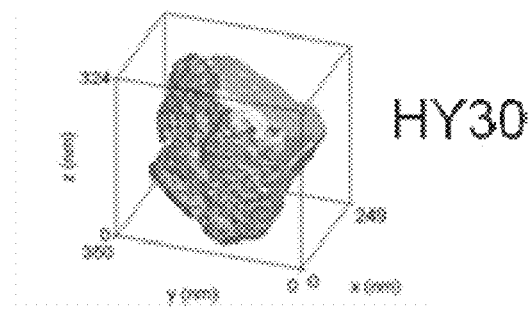
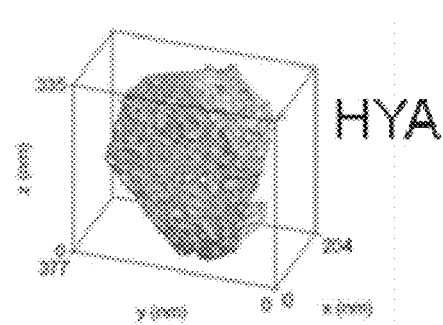
Figure 4          Figure 4A
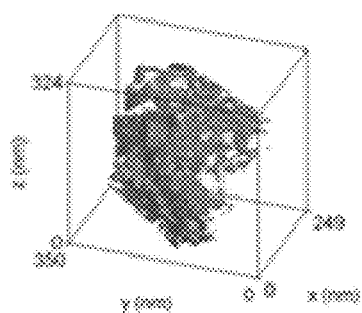
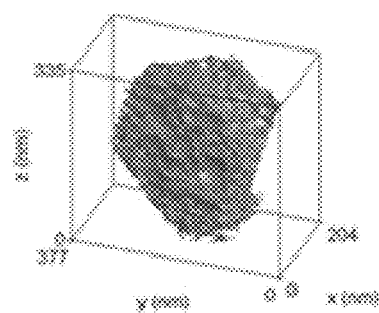
Figure 5          Figure 5A
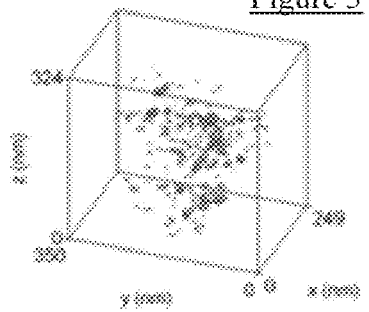
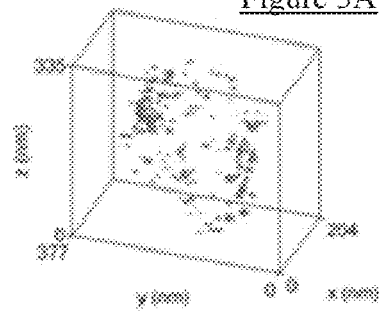
Figure 6          Figure 6A

MODIFIED Y-TYPE ZEOLITES HAVING A TRIMODAL INTRACRYSTALLINE STRUCTURE, METHOD FOR MAKING SAME, AND USE THEREOF

This application is a continuation-in-part of U.S. patent application Ser. No. 13/141,281 filed Oct. 7, 2011, now U.S. Pat. No. 9,126,183, which is a national stage of application No. PCT/FR2009/052668 filed Dec. 22, 2009, claiming priority based on French patent application No. 08 58952, filed Dec. 22, 2008, the contents of all of which are incorporated herein by reference in their entirety.

BACKGROUND OF THE INVENTION

The invention relates to the field of catalysts, in particular zeolites Y of faujasite structure.

The various zeolites are distinguished by different structures and properties. A few structures commonly used in the field of catalysis are described below.

Zeolite Y (FAU) is a large-pore three-dimensional zeolite whose structure has large cavities interconnected by channels formed from 12-membered rings (there are 12 cations ($Si^{4+}$ and $Al^{3+}$) and 12 anions $O^{2-}$ present in the ring).

Beta zeolite (BEA) is a large-pore three-dimensional zeolite comprising pores formed from 12-membered rings in all directions.

Zeolite ZMS-5 (MFI) is a medium-pore virtually three-dimensional zeolite, comprising pores formed by 10-membered rings in one direction that are interconnected by zig-zag channels formed by 10-membered rings (it is for this reason that this structure is considered as being virtually three-dimensional).

Mordenite (MOR) is a large-pore zeolite formed by 12-membered rings, with channels extending in only one direction and which has, between these channels, small pockets formed by 8-membered rings.

Ferrierite (FER) is a medium-pore dimensional zeolite comprising main channels formed by 10-membered rings, which are interconnected via side channels formed by 8-membered rings.

Zeolites are important catalytic materials that are widely used in acidic catalytic reactions such as cracking, especially hydrocracking, FCC and olefin cracking, isomerization reactions, especially of paraffins and olefins, and also in methanol conversion technologies, for example MTO, MTP and MTG.

In these reactions, zeolites, and in particular their microporous structures, are often a determining factor for obtaining good catalytic activity, good stability and/or good selectivity.

However, microporous structures may also have drawbacks, for example the poor access of molecules in zeolite crystals, undesired adsorption of reagents and/or of products during catalysis. These steric constraints reduce the accessibility of the microporous volume of the zeolite during the reaction, which may lead in certain cases to sparingly efficient or inefficient use.

Thus, one of the important factors is to obtain zeolites that offer sufficient accessibility to reagents and/or products, in order to improve the efficacy of the catalyst.

Among the envisioned solutions, mention may be made of the reduction of the size of zeolite crystals. However, this solution is not always industrially applicable.

Another strategy consists in creating a system of secondary pores, consisting of mesopores (2-50 nm), in the microporous crystals of zeolites. Traditionally, mesopores are introduced into zeolite or quasi-zeolite crystals by dealumination, for example using a hydrothermal treatment, acidic leaching techniques, or chemical treatments based on EDTA or $(NH_4)_2SiF_6$.

In recent years, various alternative techniques have been proposed:
   recrystallization of the walls of a mesoporous zeolite material,
   preparing at the mesoscopic scale a cationic polymer matrix,
   constructing a mesoporous material by means of zeolite precursors of organosilicon type, and
   direct assembly of zeolite seeds using a matrix to form the mesopores.

Some of these approaches have led to improved catalysts. However, these techniques are very complex and involve the use of very expensive organic matrices. Thus, the industrial use of these materials is still very limited, especially on account of their very high price.

Moreover, certain prior art techniques may require very specific conditions and/or the use of hazardous and/or pollutant reagents, expensive reagents and/or may not allow mass production.

Finally, certain techniques do not allow good control of the characteristics of catalysts, for example "random" or unoptimized mesoporosity, or alternatively some of the mesopores are cavities, i.e. they are not accessible or not readily accessible from the exterior.

Moreover, an alternative technique for the formation of intracrystalline mesopores has recently consisted of a desilication treatment in alkaline medium.

For example, the publication J. C. Groen et al., Microporous Mesoporous Mater. 114 (2008) 93 describes the alkaline treatment of beta zeolites, performed on the zeolite as prepared, without prior dealumination treatment. At room temperature, virtually no formation of mesopores is observed. Only a higher temperature, of about 318 K, makes it possible to observe the formation of mesopores.

Other publications concern the alkaline treatment of zeolites ZMS-5 (J. C. Groen et al., JACS 127 (2005) 10792) or MFI, BEA, FER and MOR (J. C. Groen et al., Microporous Mesoporous Mater. 69 (2004) 29).

Thus, the invention is directed toward solving all or some of the problems mentioned above.

BRIEF DESCRIPTION OF DRAWINGS

The invention is now described with reference to the attached nonlimiting drawings, in which:

FIGS. 4 and 4A show a three-dimensional reconstruction of a crystal of a commercial zeolite and of a zeolite according to the invention (HYA), and FIGS. 5 and 5A, on the one hand, and 6 and 6A, on the other hand, show a three-dimensional reconstruction of the open/closed porosity of these same commercial zeolite and zeolite according to the invention.

DETAILED DESCRIPTION OF THE INVENTION

Figure 1:
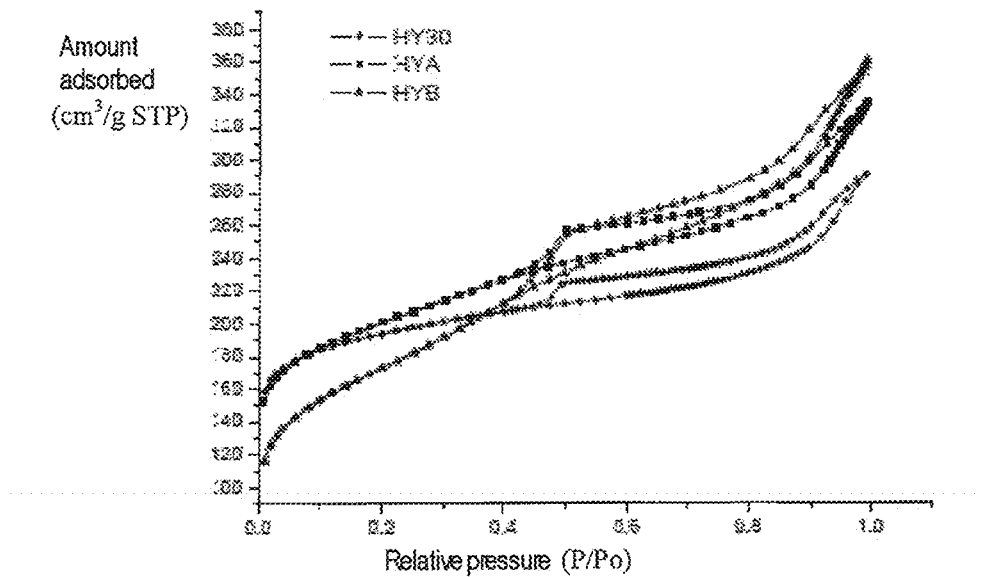
FIG. 1 shows the nitrogen adsorption isotherms of a commercial zeolite Y (HY30) and of two zeolites according to the invention (HYA and HYB curves), the adsorbed volume of nitrogen ($cm^3/g$) being represented as a function of the partial pressure of nitrogen ($P/P_0$)

According to a first aspect, a subject of the invention is a zeolite Y of modified faujasite structure whose intracrystalline structure has at least one network of micropores, at least one network of small mesopores with a mean diameter of 2 to 5 nm and at least one network of large mesopores with a mean diameter of 10 to 50 nm, these various networks being interconnected.

The modified zeolite Y of the present invention thus has trimodal intracrystalline porosity, i.e. three networks of pores of different mean diameters within each crystal.

The crystallinity of the modified zeolite Y of the present invention is 50% or more, advantageously 60% or more, more advantageously 64% or more. In an embodiment, the crystallinity of the modified zeolite Y is from 60 to 75%. In another embodiment, the crystallinity of the modified zeolite Y is from 64 to 69%.

As a reminder, zeolites Y generally have micropores with a mean diameter of between 0.7 and 1.4 nm.

In particular, the modified zeolite Y according to the invention will advantageously have a ratio Vs/Vl of the volume (Vs) of small mesopores to the volume (Vl) of large mesopores of greater than or equal to 1, especially greater than or equal to 1.20, or even greater than or equal to 1.60, most particularly greater than or equal to 1.80, and even more particularly greater than or equal to 2.

The zeolite according to the invention may have a sodium (Na) content of less than or equal to 100 ppm and especially less than or equal to 50 ppm.

The zeolite may have an Si/Al atomic ratio of less than or equal to 25, especially less than or equal to 24, or even less than or equal to 23, most particularly less than or equal to 22, even more particularly less than or equal to 21 and optionally less than or equal to 20.5.

The Si/Al ratio may also be less than or equal to 40, especially less than or equal to 35, or even less than or equal to 30, most particularly less than or equal to 28, and even more particularly less than or equal to 25.

The Si/Al atomic ratio may be greater than or equal to 6, especially greater than or equal to 8, or even greater than or equal to 10, more particularly greater than or equal to 11, and even more particularly greater than or equal to 12.

The Si/Al ratio may also be greater than or equal to 15, especially greater than or equal to 17, or even greater than or equal to 18, most particularly greater than or equal to 19 and even more particularly greater than or equal to 20.

The modified zeolite Y may have a mesopore volume of greater than or equal to 0.20 ml/g, especially greater than or equal to 0.25 ml/g, in particular greater than or equal to 0.35 ml/g, or even greater than or equal to 0.40 ml/g.

The term "mesopore volume" means the volume of the mesopores with a mean diameter of between 2 and 50 nm, which represents in the present case the sum of the volumes of the small and large mesopores.

In particular, the zeolite according to the invention may have a volume of small mesopores (Vs) of greater than or equal to 0.10 ml/g, especially greater than or equal to 0.15 ml/g, in particular greater than or equal to 0.20 ml/g, or even greater than or equal to 0.25 ml/g.

The modified zeolite Y may also have a micropore volume of less than or equal to 0.20 ml/g, especially less than or equal to 0.18 ml/g, in particular less than or equal to 0.16 ml/g, or even less than or equal to 0.125 ml/g, and most particularly less than or equal to 0.10 ml/g.

The mesopore volume/micropore volume ratio may be greater than or equal to 1, especially greater than or equal to 1.5, in particular greater than or equal to 3, or even greater than or equal to 3.5, more particularly greater than or equal to 4, even more particularly greater than or equal to 4.5 or even greater than or equal to 5.

The modified zeolite Y may have an external surface area $S_{ext}$ of greater than or equal to 200 m²/g, especially greater than or equal to 250 m²/g, in particular greater than or equal to 300 m²/g, or even greater than or equal to 350 m²/g and most particularly greater than or equal to 400 m²/g.

The modified zeolite Y may have a BET surface area $S_{BET}$ from 560 to 700 m²/g.

The density of acidic sites, measured by TPD $NH_3$, may be less than or equal to 0.25 mmol/g, especially less than or equal to 0.23 mmol/g, in particular less than or equal to 0.22 mmol/g, or even less than or equal to 0.21 mmol/g.

The modified zeolite Y has the characteristic peaks of zeolites Y on an X-ray diffraction diagram. These peaks correspond to the following interplanar distances: d=13.965, 8.552, 7.293, 5.549, 4.655, 4.276, 3.824, 3.689, 3.232, 2.851, 2.793 and 2.578 Å (reference: Collection of simulated XRD powder patterns for zeolites, fifth revised edition, by M. M. J Treacy and J. B. Higgins, Elsevier editor).

A modified zeolite Y according to the invention, or a composite material, comprising modified zeolite Y according to the invention, especially at least 20% by weight relative to the total weight of the composite material, may be prepared by the following steps:

a) suspending a zeolite Y or a composite material comprising it, especially at a content of at least 20% by weight relative to the total weight of the material, with a basic aqueous solution comprising at least one strong base, especially NaOH or KOH, and/or a weak base, in particular sodium carbonate, sodium citrate, etc., for example at a concentration ranging from 0.001 to 0.5 M, at room temperature, with magnetic or mechanical stirring, b) filtering off the zeolite Y obtained and washing it with a solvent, especially a polar solvent, for example pure distilled water, c) optionally drying the washed zeolite, d) placing the washed and optionally dried zeolite in contact, with stirring, in a solution, especially an aqueous solution, of $NH_4NO_3$, especially at a concentration ranging from 0.01 to 0.5 M, e) washing the zeolite with distilled water to neutral pH, f) calcining the zeolite obtained, and g) recovering the zeolite.

The product may allow the production of modified zeolites Y that have an Si/Al atomic ratio of greater than or equal to 5, less than or equal to 40 and/or a mesopore volume of greater than or equal to 0.22 ml/g.

Moreover, this process may allow the production of zeolites Y having, relative to the starting zeolite:
- an increase of the mesopore volume of at least 0.05 ml/g, especially of at least 0.1 ml/g, in particular of at least 0.15 ml/g, or even of at least 0.21 ml/g,
- an increase in the volume of small mesopores of at least 0.05 ml/g, especially of at least 0.1 ml/g and in particular of at least 0.15 ml/g,
- a decrease in the micropore volume of at least 0.05 ml/g, especially of at least 0.075 ml/g, in particular of at least 0.10 ml/g, or even of at least 0.15 ml/g, and/or
- a decrease in the Si/Al atomic ratio of at least 2, especially of at least 4, in particular of at least 6, or even of at least 10,
- an increase in the external surface area ($S_{ext}$) of at least 50 m$^2$/g, especially of at least 100 m$^2$/g, in particular of at least 150 m$^2$/g, or even of at least 240 m$^2$/g, and/or
- a decrease in acidity measure by TPD $NH_3$ of at least 0.05 mmol/g and especially of at least 0.1 mmol/g.

In step a), the aqueous solution/zeolite, and especially zeolite Y, weight ratio may range from 20 to 100, especially from 30 to 80, in particular from 40 to 60, or may even be about 50.

The concentration of base in the solution of step a) may range from 0.001 to 0.5 M, especially from 0.005 to 0.2, in particular from 0.01 to 0.1 or may be even be about 0.05 M.

In step d), the $NH_4NO_3$ solution/zeolite Y weight ratio may range from 5 to 75, especially from 10 to 50 and in particular from 20 to 30, or may even be about 25.

The $NH_4NO_3$ concentration of the solution of step d) may range from 0.01 to 0.5 M, especially from 0.05 to 0.4, in particular from 0.1 to 0.3, or may even be about 0.2 M.

Most particularly, the starting material is a zeolite Y that has undergone at least one dealumination treatment, in particular a partial treatment, for example acidic and/or steam treatments. These treatments may make it possible (i) to reduce the acidity of the material, (ii) to increase, albeit slightly, the mesoporosity of the initial material, which is theoretically purely microporous. Most particularly, these treatments correspond to those described in U.S. Pat. No. 5,601,798, the content of which is incorporated by reference.

The process may also comprise a step of neutralization of the solution before the first filtration. This may make it possible to stop the desilication. This desilication may have the result of creating mesoporosity, especially too much mesoporosity. At this stage, this creation of mesoporosity may be a problem, in particular if it is excessive, causing a loss of crystalline structure of the zeolite, for example a loss of microporosity, which may induce a reduction in the intrinsic activity of the material.

This neutralization step may be performed by washing with water or with any type of acid, for example sulfuric acid, in particular under industrial conditions on large amounts of product.

Advantageously, the steps of placing in contact (suspension) in a basic solution and/or in an $NH_4NO_3$ solution take place at room temperature and in particular do not require any heating.

For the purposes of the present invention, the term "room temperature" means a temperature ranging from 18 to 25° C. and in particular a temperature of 20° C.

In step a), the placing in contact with a basic solution may last from 5 to 120 minutes, especially from 10 to 60 minutes and in particular from 15 to 30 minutes.

During this placing in contact, the suspension may be stirred, especially by magnetic or mechanical stirring.

The drying step may be performed at a temperature of greater than or equal to 70° C., especially greater than or equal to 75° C., or even greater than or equal to 80° C. It may range from one to 36 hours, especially from 3 to 24 hours and in particular from 8 to 15 hours.

The drying step may last until the weight of the zeolite no longer varies, in particular when the difference between the weight of the zeolite at a time t and the weight of this zeolite after two hours of heating varies by less than 0.1% by weight relative to the weight of the zeolite.

The drying may be performed under air or under an inert atmosphere.

Step d) of placing in contact with the $NH_4NO_3$ solution may last from 2 to 24 hours, especially from 3 to 12 hours and in particular from 4 to 8 hours, or may even last about four hours.

The calcination step f) may be performed at a temperature of greater than or equal to 400° C., especially greater than or equal to 450° C., or even greater than or equal to 500° C. The heating may last from 2 to 8 hours, in particular from 3 to 6 hours or even from 5 to 7 hours.

The heating may include a temperature rise from 0.5 to 2° C./minute and especially 1° C./minute.

The heating may be performed in air or in an inert atmosphere.

The process described above may make it possible to obtain a zeolite Y with a micropore volume of less than 30%, especially 40%, in particular 45%, or even 50% of the micropore volume of the starting zeolite Y.

It may also make it possible to obtain a zeolite Y with a mesopore volume of greater than 30%, especially 35%, in particular 40% or even 45% of the mesopore volume of the starting zeolite Y. In particular, the increase in the mesopore volume is essentially due to the creation of small mesopores.

Needless to say, the invention also relates to a zeolite Y that may be obtained via the process described above.

According to another of its aspects, the invention optionally relates to the healing of the crystal defects created by the alkaline treatment, these defects leading to a decrease in the density of acidic sites measured by $NH_3$ desorption. This healing may be performed by a mild steam treatment (see van Donk et al., Generation, Characterization, and Impact of Mesopores in Zeolite Catalysts. Catalysis Reviews, 2003. 45(2): p. 297-319) leading to acidity values measured by TPD of $NH_3$ of greater than 0.25 mmol/g According to another of its aspects, a subject of the invention is particles, in particular catalytic particles, comprising the modified zeolite Y according to the invention and at least one binder, such as silica or alumina. These particles may also comprise a catalytic metal.

These particles may be prepared by mixing modified zeolite Y and at least one binder, such as silica or alumina, according to the alkaline treatment process described above.

The process for preparing these particles may also comprise a fixing step, for example by adsorption, of catalytic metal.

These subjects correspond to macroscopic shaping of the catalyst, i.e. the shaping of the modified material using a binder of silica or alumina type. This may allow, for example, a direct use of the material in typical industrial reactors, for example fixed-bed reactors. This shaping may be performed by extrusion, but may also allow a macroscopic shaping of beads or other macroscopic shapes that may be adapted to use in fixed-bed or moving-bed reactors.

In particular, the alkaline treatment process may be applied to a composition comprising at least one modified (after a dealumination process) zeolite Y and a binder, in particular in the form of particles that are ready to be used in a fixed-bed or moving-bed reactor, especially in extruded form, or in the form of beads.

This may increase the mesopore volume of the zeolite Y present in the composite material (composite material=zeolite+binder).

According to another of its aspects, a subject of the invention is a catalyst comprising a modified zeolite Y according to the invention and optionally a catalyst, especially a catalytic metal. This metal may be deposited on the zeolite by a fixing step, for example impregnation.

Among the catalytic metals that may be mentioned are platinum, palladium, nickel, cobalt and tungsten, but also the other transition metals.

According to another of its aspects, a subject of the invention is a catalyst comprising at least one zeolite as described above or a composite material comprising such a zeolite and optionally a catalyst supported thereon.

According to another of its aspects, a subject of the invention is the use of a catalyst or of particles according to the invention in a process for treating petroleum or heavy residues, especially as a hydroconversion catalyst in FCC, for example as a hydrocracking or hydroisomerization catalyst.

A subject of the invention is also a process for manufacturing a catalyst, comprising at least one step of impregnation of a catalytic metal onto a zeolite as described above.

The methods used for taking the measurements of the various characteristics are generally the standard techniques. More particularly, the following techniques were used in the context of this invention:

i) the chemical composition, in particular the Si/Al atomic ratio and the sodium content, were determined by atomic adsorption spectrometry (Central Analysis Department of the CNRS, Solaize), ii) the structure of the zeolite was defined by X-ray diffraction (XRD) using a diffractometer of Bruker Advance D8 type using the $K\alpha 12$ line of cobalt, the spectra being recorded for an angle 2 theta of between 5 and 50°, iii) the adsorption and desorption measurements were taken at the temperature of liquid nitrogen on a Micrometrics Tristar 3000 machine. Before each measurement, the samples were degassed under nitrogen at 300° C. for 840 minutes, iv) the microstructure of the zeolites was observed by transmission electron microscopy (TEM) using a Jeol 1200 EX II microscope operating at a voltage of 100 kV (magnifications 20 000-120 000), (v) the electron tomography studies were performed on a transmission electron microscope using a Tecnai 20 machine at a voltage of 200 kV. The series of images were acquired under bright field image conditions for an angular range from −75 to 75° and with an incline increment of 1° for a magnification of 19 000 or 29 000. Three-dimensional reconstructions were calculated from series of acquired inclines using IMOD software, vi) the textural properties, defined by the external surface area ($S_{ext}$), the micropore volume ($V_{micro}$), the mesopore volume ($V_{meso}$) and the BET surface area, were defined by nitrogen volumetric analysis from the adsorption isotherms recorded at 77 K on a Micromeritics ASAP 2000/2010 machine by applying the methods well known to those skilled in the art (Barett, E. P.; Joyner, L. G.; Halenda, P. P. *J. Am. Chem. Soc.* 1951, 73, 373-380. Rouquerol, F.; Rouquerol, J.; Sing. K. *Adsorption by powders and porous solids*; Academic Press: San Diego, 1999), vii) the acidity of the catalysts was established by Thermally Programmed Desorption of ammonia (TPD $NH_3$) between 100 and 650° C. (Niwa, M.; Iwamoto, M.; Segawa, K. B. *Chem. Soc. Jpn* 1986, 59) by assaying the desorbed ammonia by conductivity.

EXAMPLES

The zeolite Y sold under the name CBV760 by Zeolyst Int. is referred to herein as HY30 (batch 1). The nitrogen adsorption of HY30 (batch 1) is shown in FIG. 1, and the characteristics of HY30 (batch 1) are given in table 1.

This zeolite Y underwent a dealumination before treatment to obtain a modified zeolite Y. It has an Si/Al ratio of 28.4, an acidity measured by TPD $NH_3$ of 0.32 mmol/g and an Na content of less than 50 ppm.

Example 1

Preparation of a Modified Zeolite Y (HYA)

The compound HY30 (batch 1) is subjected to the following alkaline treatment:

HY30 (2 g) is placed in contact with aqueous 0.05 M NaOH solution (50 ml) for 15 minutes at room temperature with stirring, the resulting product is filtered off and washed with water until a neutral pH is obtained, the filtered product is dried for 12 hours at 80° C., aqueous 0.20 M $NH_4NO_3$ solution (50 ml) is added to the dried product, and the whole is left stirring for 5 hours at room temperature, the product obtained is washed with distilled water (3×50 ml), the product is then calcined at 500° C. for 4 hours (temperature gradient of 1° C./minute) under a stream of air, and then the product HYA is recovered.

The product HYA has an Si/Al ratio of 24.8, an acidity measured by TPD $NH_3$ of 0.20 mmol/g and an Na content of less than 50 ppm.

Example 2

Preparation of a Modified Zeolite Y (HYB)

The compound HY30 (batch 1) is subjected to the following alkaline treatment:

HY30 (2 g) is placed in contact with aqueous 0.10 M NaOH solution (50 ml) for 15 minutes at room temperature with stirring, the resulting product is filtered off and washed with water until a neutral pH is obtained, the filtered product is dried for 12 hours at 80° C., aqueous 0.20 M $NH_4NO_3$ solution (50 ml) is added to the dried product, and the whole is left stirring for 5 hours at room temperature, the product obtained is washed with distilled water (3×50 ml), the product is then calcined at 500° C. for 4 hours (temperature gradient of 1° C./minute) under a stream of air, and then the product HYB is recovered.

The product HYB has an Si/Al ratio of 20.5, an acidity measured by TPD $NH_3$ of 0.21 mmol/g and an Na content of less than 50 ppm.

Characterization of the Compounds HY30 (Batch 1), HYA and HYB

Characterization by Nitrogen Adsorption

The nitrogen adsorption isotherm curves for HY30 (batch 1), HYA and HYB are shown in FIG. 1.

The presence of a hysteresis loop on each of the isotherms demonstrates the presence of mesopores in each of the samples.

Comparison of the isotherms presented in this FIG. 1, and in particular the increase in the absorbed amount at the highest relative pressures shows that the alkaline treatment causes an increase in the total porosity between HY30 and HYA, HYB.

In addition, the higher the concentration of NaOH, the greater the porosity.

At the lowest relative pressures, the nitrogen adsorption that corresponds to the microporosity does not appear to vary for the compound HY30 and the weakly basified HYA samples. The harsher alkaline treatment of the HYB samples leads to a decrease in the micropore volume and to even greater mesoporosity.

The development of mesoporosity is confirmed by a BJH (Barret-Joyner-Halenda) analysis of the pore size distribution. This analysis, derived from the adsorption part of the isotherm, is shown in FIG. 2.

Figure 2:
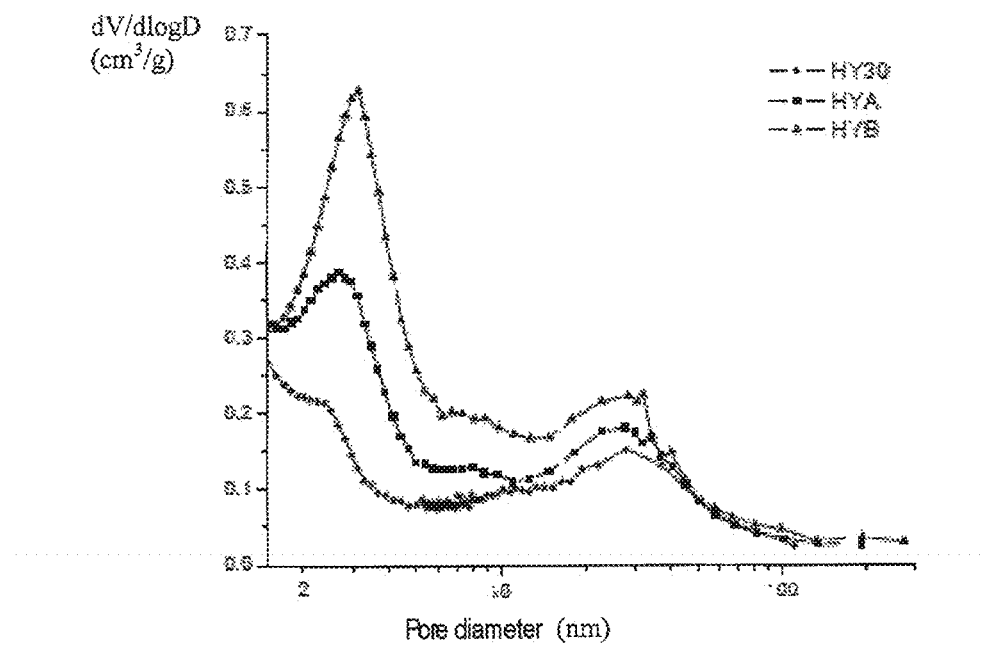
FIG. 2 shows the dV/d log D curves of adsorption BJH as a function of the pore diameter (nm) measured for a commercial zeolite Y (HY30) and two zeolites according to the invention (HYA and HYB curves)

As shown by this FIG. 2, the BJH adsorption clearly shows two distinct zones of micropore sizes:

a zone of "small mesopores" centered on 3 nm
a zone "large mesopores" centered on 30 nm.

From the compound HY30 (no alkaline treatment) to the compound HYA (mild alkaline treatment) and then to the compound HYB (harsh alkaline treatment), the intensity of the peak corresponding to the small mesopores increases significantly, while the intensity of the peak corresponding to the large mesopores only shows a small increase coupled with small broadening.

This shape of the BJH adsorption curves shows that the alkaline treatment of the compounds essentially induces the formation of small mesopores, whereas an increase the volume of the large mesopores is less pronounced. Furthermore, the sizes of the two types of mesopore do not appear to be dependent on the alkaline treatment conditions.

Table 1 shows the characteristics of HY30 (batch 1), HYA and HYB. In particular, the corresponding volumes of the small and large mesopores are derived from the integration of the BJH adsorption part for a chosen range of diameters.

TABLE 1

| Sample | | HY30 (batch 1) | HYA | HYB |
| --- | --- | --- | --- | --- |
| $S_{ext+meso}{}^a$ | $m^2/g$ | 213 | 339 | 443 |
| $V_{micro}{}^b$ | $cm^3/g$ | 0.21 | 0.16 | 0.07 |
| $V_{meso}{}^c$ | $cm^3/g$ | 0.16 | 0.25 | 0.37 |
| $V_{small\ meso}{}^d$ | $cm^3/g$ | 0.07 | 0.14 | 0.23 |
| $V_{large\ meso}{}^e$ | $cm^3/g$ | 0.09 | 0.11 | 0.14 |
| $V_{macro}{}^f$ | $cm^3/g$ | 0.02 | 0.02 | 0.03 |
| $V_{tot}{}^g$ | $cm^3/g$ | 0.45 | 0.51 | 0.55 |
| Pore diameter[h] | "small" | — | 2.7 | 3.1 |
| (nm) | "large" | 28 | 27 | 27 |

[a] surface area of mesopores and external surface area calculated from t-plot
[b] micropore volume obtained by t-plot
[c] mesopore volume obtained by integration of the BJH dV/dD adsorption curve for the pores from 2 to 50 nm in diameter,
[d] volume of the small mesopores obtained by integration of the BJH dV/dD adsorption curve for the pores from 2 to 8 nm in diameter,
[e] volume of the large mesopores obtained by integration of the BJH dV/dD adsorption curve for the pores from 8 to 50 nm in diameter,
[f] volume of the macropores obtained by integration of the BJH dV/dD adsorption curve for the pores greater than 50 nm in diameter,
[g] volume adsorbed at p/po = 0.99
[h] pore size distribution obtained from the BJH dV/dlogD adsorption curve.

Table 2 also shows the characteristics of HYA and HYB, obtained from another batch of HY30 (batch 2), in the same conditions as previously described in examples 1 and 2. In particular, values derived from a BJH desorption curve for a chosen range of diameters are shown.

TABLE 2

| Sample | | HY30 (batch 2) | HYA | HYB |
| --- | --- | --- | --- | --- |
| Si/Al | | Si/Al = 27.1 (XRF) | Not determined | Not determined |
| Crystallinity | % | 86 | 64-67 | 65-69 |
| Surface area (BET surface)[a] | $m^2/g$ | 918 | 696 | 564 |
| $V_{Total\ Porous}{}^b$ | $cm^3/g$ | 0.531 | 0.511 | 0.546 |
| $V_{micro}{}^c$ | $cm^3/g$ | 0.332 | 0.156 | 0.05 |
| $V_{meso}{}^d$ | $cm^3/g$ | 0.2 | 0.25 | 0.36 |
| Pore volume ($cm^3/g$) | $Vs_{meso}{}^e$ 2-8 nm | 0.100 | 0.197 | 0.291 |
| | $Vl_{meso}{}^f$ 8-50 nm | 0.095 | 0.102 | 0.125 |
| $Vs_{meso}/Vl_{meso}$ | | 1.1 | 1.9 | 2.3 |

[a] BET surface area calculated as described above (Page 11 (vi))
[b] total porous volume calculated as described above (Page 11(vi))
[c] micropore volume obtained by t-plot
[d] mesopore volume obtained by integration of the BJH dV/dD adsorption curve for the pores from 2 to 50 nm in diameter ($Vs_{meso} + Vl_{meso}$)
[e] volume of the small mesopores ($Vs_{meso}$) obtained by integration of the BJH dV/dD adsorption curve for the pores from 2 to 8 nm in diameter
[f] volume of the large mesopores ($Vl_{meso}$) obtained by integration of the BJH dV/dD adsorption curve for the pores from 8 to 50 nm in diameter.

Characterization by X-Ray Diffraction and Transmission Electron Microscopy (TEM)

The X-ray diffraction analysis confirms the conservation of crystallinity of the HYA sample that has undergone a mild alkaline treatment, relative to the starting compound HY30.

The HYB sample that has undergone a harsher alkaline treatment shows partial destruction of the long-range crystal ordering, but the overall crystallinity of the sample is preserved, the characteristic peaks still being present. The morphology of the zeolite Y is also confirmed by nitrogen physisorption and electron microscopy.

The crystallinity of the HYA and HYB samples is 50% or more, and preferably 60% or more.

The TEM micrographs show that the large crystals of zeolite Y remain intact, even after a harsh alkaline treatment. The presence of mesopores in the form of channels and spheres is observed inside all the particles, the channels penetrating the particle, connecting the outer surface to the interior of the particle. Furthermore, the samples that have undergone an alkaline treatment appear to have a structure similar to a sponge, in contrast with the starting compound HY30. The TEM micrographs do not make it possible to distinguish the bonds between the pores and the shape and general sizes of the pores.

Characterization by Electron Tomography (3D-TEM)

In contrast with conventional TEM microscopy, electron tomography allows better observation of the internal structure of the complex pore structure of the studied samples. In order to confirm the results of the trimodal structure demonstrated by nitrogen physisorption, the samples were subjected to a 3D-TEM analysis, and the 3-dimensional (3D) reconstructions of the chosen particles were obtained.

Figure 3:
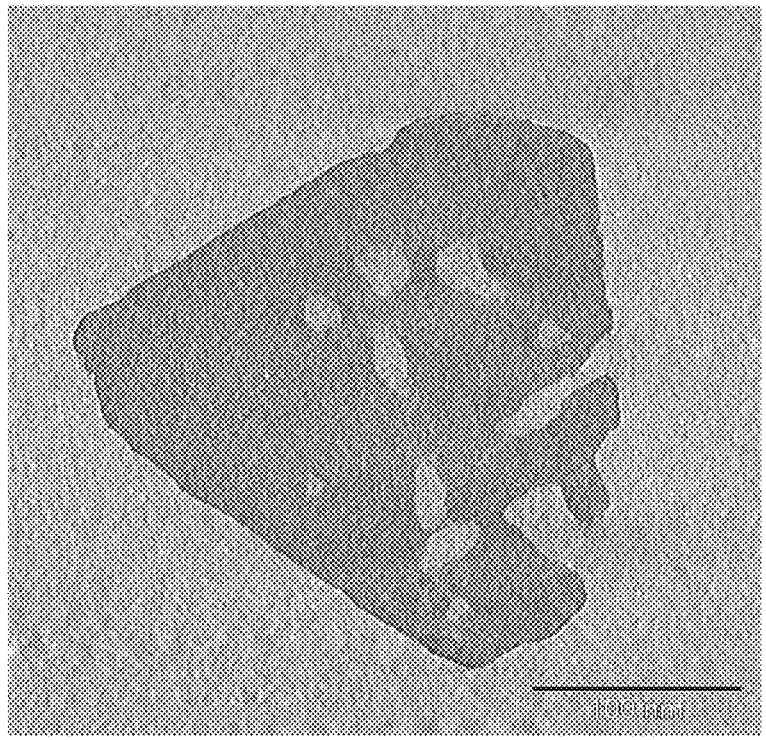
FIGS. 3, 3A and 3B show, respectively, a TEM-3D image of a commercial zeolite Y (HY30) and of two zeolites according to the invention (HYA and HYB)
Figure 3A:
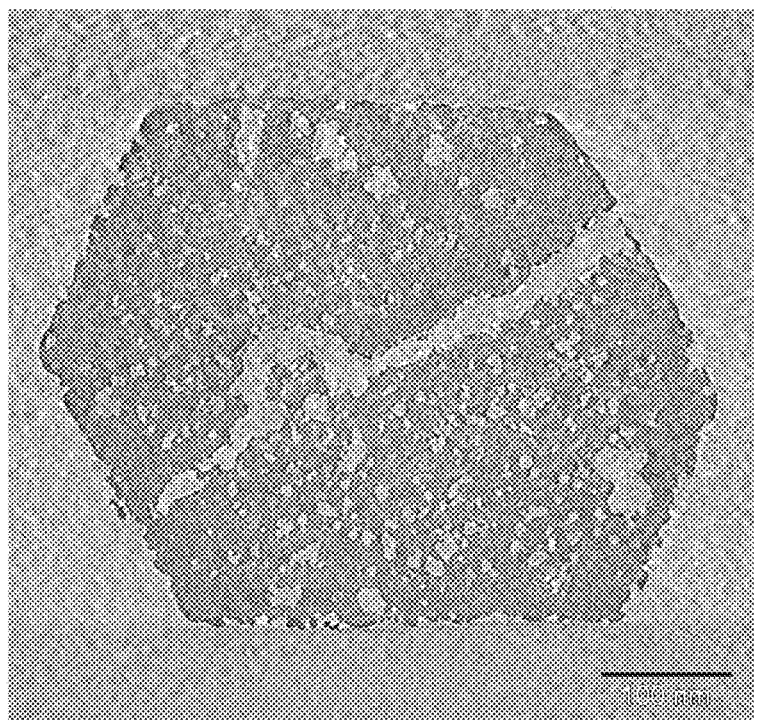
Figure 3B:
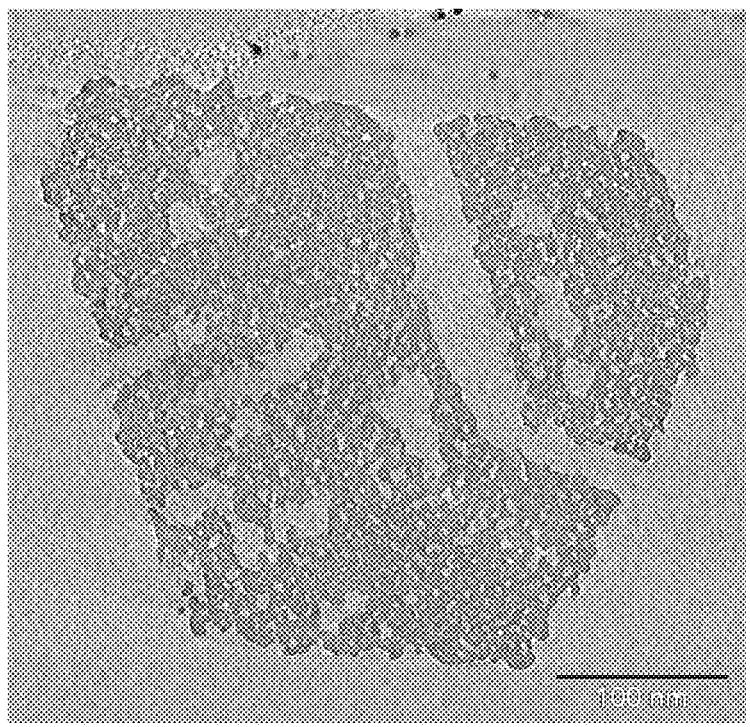

FIGS. 3, 3A and 3B show a cross section by 3D reconstruction of each of the three samples. Since the slices observed have a thickness of between 0.5 and 0.8 nm, they are not affected by the overlap characteristics, as is the case for conventional TEM micrographs.

The lightest regions correspond to the pores, and the dark regions represent the solid material.

FIG. 3 shows a cross section of sample HY30, 0.82 nm thick: the steam and acid treatment to which this sample is subjected is mainly responsible for the creation of large mesopores in the form of channels and spheres, with a large range of diameters, as shown by nitrogen physisorption. The channel-shaped mesopores intersect and penetrate the particle from the outside inwards. The presence of isolated cavities is also confirmed. Although the nitrogen physisorption shows that small mesopores are present for a volume virtually identical to that of the large mesopores, they appear to be absent.

FIG. 3A shows a cross section 0.82 nm thick of sample HYA that has undergone a moderate alkaline treatment. A new series of small mesopores has appeared and the walls of the mesopores in the form of channels and cavities are more irregular. The formation of small mesopores, and their diameter (2-5 nm), may be measured with great precision and is in agreement with the results obtained from the nitrogen physisorption. Furthermore, the small mesopores that have appeared seem to be uniformly distributed over the entire volume of the particle and are interconnected.

FIG. 3B is a cross section 0.54 nm thick of the sample HYB that has undergone a harsh alkaline treatment. An increase in the number of small mesopores is observed, confirming the results of the nitrogen physisorption. Pores with a diameter as small as 1.2 nm may be observed, and the general density of these small mesopores appears to be greater than in compound HYA. As for the sample HYA, the 3D reconstruction of the entire particle indicates interconnections of these small mesopores.

FIGS. 4 to 6 and 4A to 6A make it possible to visualize the open and closed porosity of compounds HY30 and HYA, respectively.

The open porosity (FIGS. 5 and 5A) shows all the mesopores that are accessible from the outer surface of a crystal via mesopores.

The closed porosity (FIGS. 6 and 6B) shows the mesopores that are accessible from the outer surface of a crystal only via the micropores; these figures thus represent cavities.

FIGS. 4 and 4A represent the total volume of the crystal of HY30 and HYA, respectively analyzed. In FIGS. 5, 5A, 6 and 6A, the dark zones represent the intracrystalline mesopores.

FIGS. 5A and 6A show that the mesopore system of the HYA crystal corresponds substantially to the entire volume of the crystal, which is not the case for the mesopore system of HY30, which is visibly smaller (FIG. 5). Moreover, the number of cavities in the HYA crystal is considerably reduced relative to a zeolite Y that has not undergone an alkaline treatment (HY30).

The very large volume of mesopores that are accessible from the outer surface of an HYA crystal via mesopores implies that these mesopores are interconnected. The mesopore system of HYA is thus improved and shows better interconnectivity than in the case of HY30.

Conclusion

The various characterizations demonstrated the particular mesoporous structure of modified zeolites Y according to the invention.

The steam treatment followed by an acid treatment (HY30) leads essentially to the generation of mesopores of about 30 nm in the form of channels and cavities.

Figure 7:
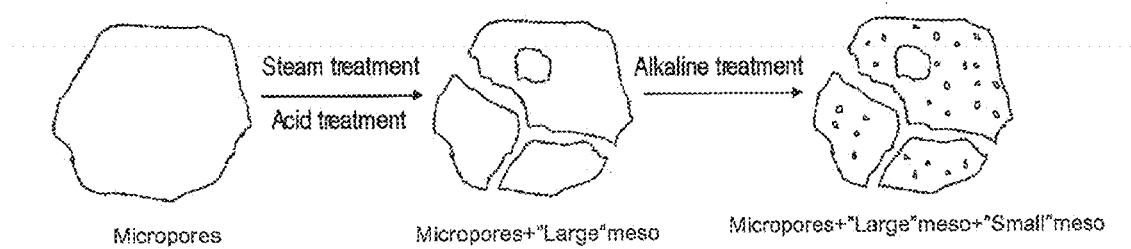
FIG. 7 is a scheme showing the possible effect of a treatment according to the invention.

An additional alkaline treatment leads to the formation of a new network of small mesopores. The modified zeolites according to the invention thus have a "trimodal" pore system, containing micropores, small mesopores and large mesopores, as shown schematically in FIG. 7.

Without wishing to be bound by this theory, it appears from the 3D-TEM analysis that these various networks of micropores and mesopores, and in particular the new pores formed (network of small mesopores), are interconnected (the networks of mesopores being interconnected via the micropores), which would make it possible to reduce the molecular diffusion limitations usually encountered, leading to increased catalytic activity of the zeolites according to the invention, as shown by the following examples.

Example 3

Catalysis—Hydrocracking of n-Hexadecane

Catalysts are prepared from HY30 (HY30/Pt) and from HYA (HYA/PT) by impregnation of a solution of platinum salts, so as to lead to a Pt charge of 0.3% by weight approximately relative to the total weight of the catalyst.

The catalysts were tested under the following conditions:
WHSV: 1-4 $h^{-1}$
$H_2$/HC: 3-4 mol/mol;
Pressure: 20 bar;
Temperature: 170-350° C.;
Amount of catalyst ~1.3 g (Ø 180-425 μm)

The products were analyzed on line with a gas chromatograph of GC HP 5890 series 2 type (apolar HP-1 column, 30 m, 0.53 mm, 2.65 μm).

Figure 8:
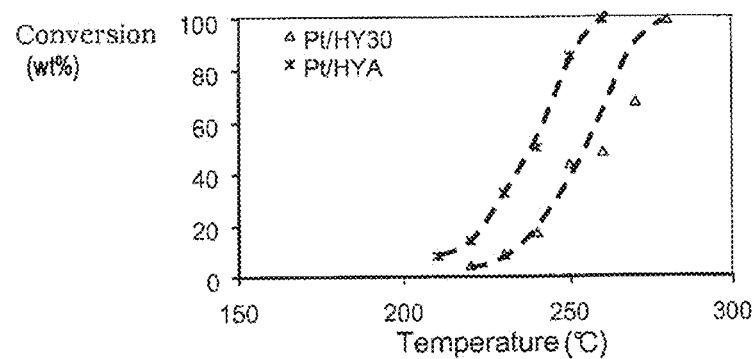
FIG. 8 shows the degree of conversion (weight %) as a function of the temperature (° C.) of hydrocracking of n-hexadecane by a catalyst comprising commercial zeolite Y (HY30/Pt) and by a catalyst according to the invention (HYA/Pt)

FIG. 8 shows the degree of conversion as a function of the temperature for HYA/Pt and HY30/Pt. The gain in activity of the HYA/Pt catalyst is of the order of 10 to 20° C. for the hydrocracking of n-hexadecane. At 240° C., the rate of reaction for the hydrocracking of n-hexadecane is more than 4 times higher for HYA/Pt than for HY30/Pt, 4.1× $10^{-4}$ g·$s^{-1}$·$g^{-1}$ and 0.9 g·$s^{-1}$·$g^{-1}$, respectively.

Figure 9:
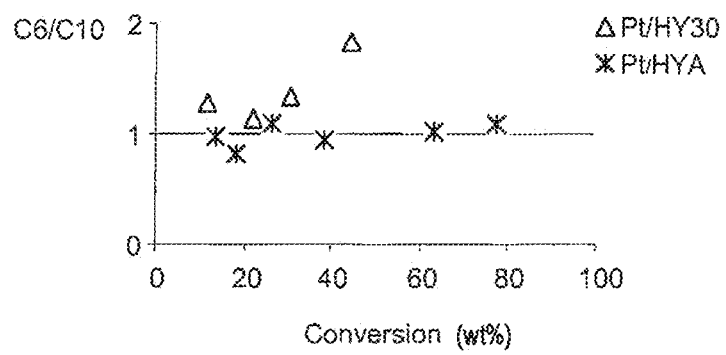
FIG. 9 shows the C6/C10 ratio as a function of the degree of conversion obtained for the hydrocracking of n-hexadecane by a catalyst comprising commercial zeolite Y (HY30/Pt) and by a catalyst according to the invention (HYA/Pt)

FIG. 9 shows the C6/C10 ratio as a function of the degree of conversion for the hydrocracking of n-hexadecane (C16).

This figure shows better hydrocracking behavior, which, for the cracking of C16, is defined by a symmetrical distribution about C8 (as defined by I. E. Maxwell et al., Handbook of Heterogeneous Catalysis, vol. 4, Wiley-VCH, Weinheim 1997, p. 2017). The cracking symmetry may be characterized by the C6/C10 ratio (mol/mol), which, in the case of "ideal hydrocracking", must be about 1.

This cracking symmetry reflects the fact that the occurrence of secondary cracking, or the manufacture of gas, is significantly reduced over the entire degree of conversion range.

It may be considered that HYA/Pt is close to ideal hydrocracking behavior, the C6/C10 ratio being very close to 1 over the entire degree of conversion range.

Example 4

Catalysis—Hydrocracking of Squalane

The hydrocracking of squalane was also tested.

Squalane (or hexamethyltetracosane) is an organic molecule of paraffinic type comprising 30 carbon atoms, six of which are in methyl groups, at positions 2, 6, 10, 15, 19 and 23, respectively. Its steric bulk is greater than for that of hexadecane, and it may, to a certain extent, be used as a model molecule for hydrocracking charges (high molecular weight). Catalysts are prepared from HY30 (HY30/Pt) and from HYA (HYA/Pt) by impregnation of a solution of platinum salts, so as to lead to a Pt charge of about 0.3% by weight relative to the total weight of the catalyst.

The catalysts were tested under the following conditions:
WHSV: 1-4 h$^{-1}$
H$_2$/HC: 3-4 mol/mol;
Pressure: 20 bar;
Temperature: 170-350° C.;
Amount of catalyst ~1.3 g (Ø 180-425 μm)

The products were analyzed on line with a chromatograph of HP5975C type (HP-5 30 m, 0.25 mm, 0.25 μm capillary column).

The symmetry of the squalane hydrocracking products is also significantly improved.

Figure 10:
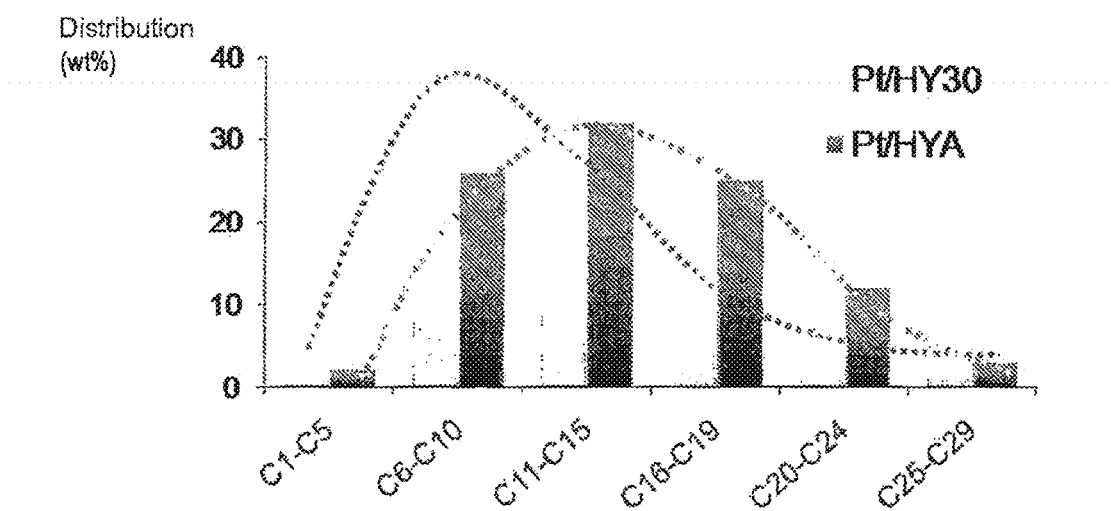
FIG. 10 shows the distribution (weight %) of the squalane hydrocracking products obtained by a catalyst comprising commercial zeolite Y and by a catalyst according to the invention, for a degree of conversion of 75%.

FIG. 10 shows the yield distribution for HY30/Pt and HYA/Pt, measured at a degree of conversion of 75%.

This FIG. 10 shows a significant reduction of the secondary cracking contribution, and thus of the production of gas, and also improved selectivity and an increased yield of middle distillates for similar degrees of conversion.

The invention claimed is:

1. A zeolite Y of modified faujasite structure, whose intracrystalline structure has at least one network of micropores, at least one network of small mesopores with a mean diameter of 2 to 5 nm, and at least one network of large mesopores with a mean diameter of 10 to 50 nm, these various networks being interconnected, and wherein a Si/Al atomic ratio of the modified zeolite Y is from 17 to 35 and a crystallinity of the modified zeolite Y is 50% or more.

2. The modified zeolite as claimed in claim 1, in which the ratio Vs/Vl of the volume of the small mesopores (Vs) to the volume of the large mesopores Vl is greater than or equal to 1.

3. The modified zeolite as claimed in claim 2, in which the ratio Vs/Vl is greater than or equal to 1.20.

4. The modified zeolite as claimed in claim 3, in which the ratio Vs/Vl is greater than or equal to 1.60.

5. The modified zeolite as claimed in claim 4, in which the ratio Vs/Vl is greater than or equal to 1.80.

6. The modified zeolite as claimed in claim 5, in which the ratio Vs/Vl is greater than or equal to 2.

7. The modified zeolite as claimed in claim 1, characterized in that it has a total mesopore volume of greater than or equal to 0.20 ml/g.

8. The modified zeolite as claimed in claim 7, wherein the total mesopore volume is greater than or equal to 0.25 ml/g.

9. The modified zeolite as claimed in claim 8, wherein the total mesopore volume is greater than or equal to 0.35 ml/g.

10. The modified zeolite as claimed in claim 9, wherein the total mesopore volume is greater than or equal to 0.40 ml/g.

11. The modified zeolite as claimed in claim 1, characterized in that it has a micropore volume of less than or equal to 0.20 ml/g.

12. The modified zeolite as claimed in claim 11, wherein the micropore volume is less than or equal to 0.18 ml/g.

13. The modified zeolite as claimed in claim 12, wherein the micropore volume is less than or equal to 0.16 ml/g.

14. The modified zeolite as claimed in claim 13, wherein the micropore volume is less than or equal to 0.125 ml/g.

15. The modified zeolite as claimed in claim 14, wherein the micropore volume is less than or equal to 0.10 ml/g.

16. The modified zeolite as claimed in claim 1, characterized in that it has a total mesopore volume/micropore volume ratio of greater than or equal to 1.

17. The modified zeolite as claimed in claim 16, wherein the total mesopore volume/micropore volume ratio is greater than or equal to 1.5.

18. The modified zeolite as claimed in claim 17, wherein the total mesopore volume/micropore volume ratio is greater than or equal to 3.

19. The modified zeolite as claimed in claim 18, wherein the total mesopore volume/micropore volume ratio is greater than or equal to 3.5.

20. The modified zeolite as claimed in claim 19, wherein the total mesopore volume/micropore volume ratio is greater than or equal to 4.

21. The modified zeolite as claimed in claim 20, wherein the total mesopore volume/micropore volume ratio is greater than or equal to 4.5.

22. The modified zeolite as claimed in claim 21, wherein the total mesopore volume/micropore volume ratio is greater than or equal to 5.

23. Catalytic particles, comprising the modified zeolite as claimed in claim 1 and at least one binder, such as silica or alumina.

24. The catalytic particles as claimed in claim 23, comprising at least 20% by weight of zeolites relative to the total weight of the particles.

25. The catalytic particles as claimed in claim 23, also comprising a catalytic metal.

26. A process for preparing the modified zeolite Y as claimed in claim 1 or a composite material comprising the modified zeolite Y as claimed claim 1, wherein the modified zeolite Y is present in an amount that is at least 20% by weight relative to the total weight of the composite material, comprising the following steps:
   a) suspending a zeolite Y or a composite material comprising it with a basic aqueous solution comprising at least one strong base, and/or a weak base at a concentration ranging from 0.001 to 0.5 M, at room temperature, with magnetic or mechanical stirring,
   b) filtering off the zeolite obtained and washing it with a polar solvent,
   c) optionally drying the washed zeolite,
   d) placing the washed and optionally dried zeolite in contact, with stirring, in a solution, especially an aqueous solution, of NH$_4$NO$_3$ at a concentration ranging from 0.01 to 0.5 M,
   e) washing the zeolite with distilled water to neutral pH,
   f) calcining the zeolite obtained, and
   g) recovering the modified zeolite Y.

27. The preparation process as claimed in claim 26, characterized in that, in step a), the aqueous solution/zeolite Y weight ratio ranges from 20 to 100.

28. The preparation process as claimed in claim 27, wherein the aqueous solution/zeolite Y weight ratio ranges from 30 to 80.

29. The preparation process as claimed in claim 28, wherein the aqueous solution/zeolite Y weight ratio ranges from 40 to 60.

30. The preparation process as claimed in claim 29, wherein the aqueous solution/zeolite Y weight ratio is about 50.

31. The preparation process as claimed in claim 26, characterized in that, in step d), the NH$_4$NO$_3$ solution/zeolite Y weight ratio ranges from 5 to 75.

32. The preparation process as claimed in claim 31, wherein the NH$_4$NO$_3$ solution/zeolite Y weight ratio ranges from 10 to 50.

33. The preparation process as claimed in claim 32, wherein the NH$_4$NO$_3$ solution/zeolite Y weight ratio ranges from 20 to 30.

34. The preparation process as claimed in claim 33, wherein the NH$_4$NO$_3$ solution/zeolite Y weight ratio is about 25.

35. The preparation process as claimed in claim 26, characterized in that the starting material is a zeolite Y that has undergone at least one dealumination treatment.

36. The preparation process as claimed in claim 35, wherein the at least one dealumination treatment is a partial treatment, for example with at least one acid and/or steam treatment.

37. The preparation process as claimed in claim 26, characterized in that it also comprises a step of neutralization of the solution before the filtration.

38. The preparation process as claimed in claim 26, characterized in that it allows the production of modified zeolites Y having, relative to the starting zeolite:
- an increase in the mesopore volume of at least 0.05 ml/g,
- a decrease in the micropore volume of at least 0.05 ml/g, and/or
- a decrease in the Si/Al atomic ratio of at least 2.

39. The preparation process as claimed in claim 26, also comprising a step of fixing a catalyst.

40. The preparation process as claimed in claim 39, wherein the step of fixing a catalyst comprises impregnation of a catalytic metal.

41. The process for preparing the modified zeolite Y or the composite material as claimed in claim 26, wherein the at least one strong base is NaOH or KOH, and the weak base is sodium carbonate or sodium citrate.

42. The modified zeolite as claimed in claim 1, wherein the crystallinity of the modified zeolite Y is 60% or more.

43. The modified zeolite as claimed in claim 42, wherein the crystallinity of the modified zeolite Y is from 60 to 75%.

44. The modified zeolite as claimed in claim 43, wherein the crystallinity of the modified zeolite Y is from 64% to 69%.

45. The modified zeolite as claimed in claim 1, wherein the modified zeolite Y has a BET surface from 560 to 700 $m^2/g$.

* * * * *